Patented Sept. 7, 1948

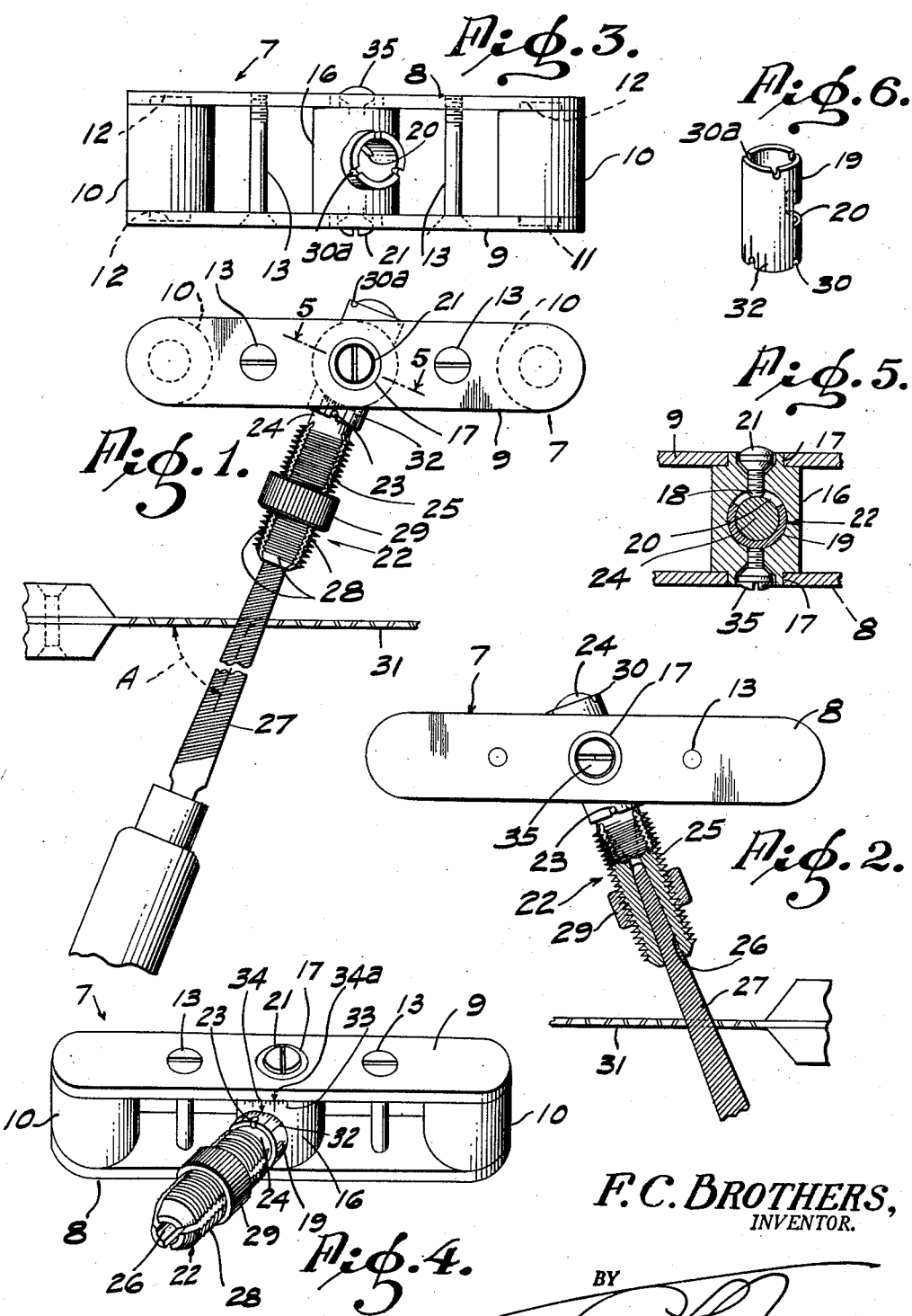

2,448,702

UNITED STATES PATENT OFFICE 2,448,702

COMBINED HANDLE MEANS AND FILE GUIDE FOR SAW FILES

Frederick C. Brothers, Los Angeles, Calif.

Application June 2, 1947, Serial No. 751,857

3 Claims. (Cl. 76—36)

This invention relates to a combined handle means and file guide for saw files.

The purpose of this saw-filer's tool is to furnish a handle for the outer end of a triangular file that will indicate any desired pitch and size angle of the file in relation to the teeth of the saw being filed, both of which angles may be instantly reversed when the tool is directed against the opposite side of the blade of the saw, without changing the adjustment of either angle.

The major problem which confronts a saw filer is how to file a saw's teeth at a certain proper predetermined angle and to maintain that file position while filing all the way along one side of the saw, and then when the saw is turned around in the vise so as to present its opposite side to the workman to maintain, in reverse both the horizontal and vertical (side and pitch) angles of the file in relation to the teeth of the saw.

It is an object of this invention, not only to indicate to the sight both the side and pitch tooth-filing angles, but also to provide a tool which can be used, in one simple operation, to reverse both these angles when the workman completes filing one side of the saw and begins to file the opposite side thereof.

Another object of the invention is to provide an improved handle means for the outer end portion of the file.

Yet another object is to provide an improved combination of chuck and chuck-mounting means for detachably securing the outer end portion of the file to the additional handle means provided by the invention.

Other objects, advantages and features of invention will hereinafter appear.

Referring to the accompanying drawing, which illustrates a preferred embodiment of the invention as now reduced to practice, Fig. 1 is a plan view of the device including a file, said file being operatively related to a saw a fragment of which is shown, portions of the handle of the file being broken away to contract the length of the view.

Fig. 2 is a view similar to Fig. 1 except that the device is reversed so as to be in a position for filing the sides of the teeth of the saw opposite to those being sharpened in Fig. 1. Also in Fig. 2 the file-holding clutch is shown partly in section, and the entire handle part together with a portion of the file adjacent thereto is broken away.

Fig. 3 is a side elevation of the handle-forming head of the device separately shown.

Fig. 4 is a perspective view looking toward the near side of the handle-forming head of the device of Fig. 1 with the file clutch included.

Fig. 5 is a section on line 5—5 of Fig. 1.

Fig. 6 is a perspective view of the clutch holding sleeve per se.

Referring in detail to the drawing the embodiment of the invention therein shown comprises a handle-forming head 7 which includes a pair of oppositely disposed spaced apart parallel side plates 8 and 9 having cylindrical spacing blocks 10 between their end portions, the end portions of said blocks being provided with central bosses 11 which occupy shallow recesses 12 extending into the inner faces of said side plates. Said plates are secured together in a fixed relation to each other by means of flat-headed screw bolts 13, the heads of which are countersunk into the outer face of one of said plates, the opposite ends of said screws being screwed into apertures provided for them in the opposite plate.

Bridging the space between the midlength portions of the head-forming handle plates is a cylindrical housing member 16 having diametrically reduced end portions 17 fitted into circular apertures located at both the midwidth and midlength of said plates. This housing is turnably adjustable and is frictionally maintained in adjusted position by the clamping action of the aforesaid screw bolts 13. Said housing member has through its midlength portion a diametrical bore 18 (Fig. 5) into which bore is turnably fitted a sleeve 19, said sleeve being provided at its midlength with a circumferentially extending arcuate slot 20 into which extends the point portion of a screw 21 which abuts laterally against the inner end portion of a chuck 22, said point portion of said screw also limiting the turning movement of said sleeve 19 and likewise the turning movement of the chuck 22, because said sleeve and chuck are held in the selected circumferential relation to each other by a pin 23 which projects radially from the cylindrical end portion 24 of the chuck 22. The end of said chuck opposite to its said cylindrical portion is screw-threaded at 25 and has led into it a tapered axial socket 26 which is cross-sectionally shaped to have fitted into it the outer end portion of the triangular file 27. In order to adapt said socket portion of the chuck for receiving the end portions of different sized files, said end portion thereof is provided with a plurality of longitudinal recesses thereby producing in it a plurality of tongues 28 adapted to be sprung into a close gripping contact with the supported file by means of an internally threaded clamping ring 29. Files of various sizes may have their point portions projected into the open end of the chuck and clamped between the tongues and maintained there by means of the clamping ring 29.

Said sleeve 19 is provided in its end portions with a plurality of semicircular notches 30, 30a. In the illustrated embodiment of the invention three of such notches are shown in each end of the sleeve, the pin 23 being receivable into the selected notch. Each individual notch at one end of the sleeve is diametrically opposite to a corresponding notch at the opposite end of the sleeve, this arrangement being necessary to provide for correctly holding the file in the right filing positions shown in Figs. 1 and 2, in relation to the teeth of the saw 31 being filed.

In order to establish the correct pitch angle of the file in relation first to one side and then the other side of the teeth being filed, I provide a series of graduations 32 upon one end of the sleeve which are positioned to cooperate with graduations 33 on the adjacent end portion of the housing 16, there being a guide arrow 34 inscribed upon the periphery of the housing to guide the workman in making the proper vertical turning adjustment of the sleeve 19 in selecting the proper pitch angle and there being a guide arrow 34a inscribed upon the edge of the plate 9 positioned to cooperate with graduations 33 to guide the workman in making the proper horizontal turning adjustment of the barrel 16 in selecting the proper side angle.

In addition to the already mentioned screw 21 which limits the range of turning adjustment of the sleeve 19, a screw 35 is provided to clamp the sleeve 19 in its properly adjusted position, such position determining the desired pitch angle.

In regard to the operation of the tool, from the description thereof already given it will be seen that the procedure involved in reversing the pitch angle (vertical angle) and the side angle (horizontal angle) resides in taking advantage of the complementary and supplementary angles generated by turning the pair of handle-forming plates through an angle of 180 degrees in relation to their longitudinal axes, preparatory to filing the opposite side of the saw, and at the same time turning the notched sleeve 19 through an angle of 180 degrees in relation to the longitudinal axis of said paired plates.

When the workman has completed filing one side of the saw and wishes to reverse both the angular positions of the tool, he will release the screw 21 and will then withdraw the chuck 22 thereby disengaging the pin 23 from its cooperating notch 30. Thereupon he will turn the gage assembly about the longitudinal axis of the paired plates 8 and 9, after doing which he will insert the clutch into the diametrically opposite slot 30a in the opposite end of the sleeve 19 and again tighten the screw 21.

Preparatory to filing the saw the blade thereof should be firmly secured in a vise with its toothed edge extending horizontally, and in using the file the paired arms 8 and 9 should be maintained parallel to the toothed edge of the saw and in a horizontal plane.

It is obvious that the invention may be used in an equally advantageous manner for filing either rip saws or cross-cut saws.

The teeth of the saw may be filed with the acute angle A Fig. 1 towards the handle (known as "filing to the point"), or the filing may be done with an obtuse angle towards the handle (filing to the heel), but in either case both sides of the saw must be filed in the same way, that is, both sides either with acute angle towards saw handle that is ("filing to the point") or both sides with obtuse angle towards saw handle ("filing to the heel").

It is sometimes contended that filing to the point leaves a burr on the cutting edge of the teeth, and that filing in the opposite direction leaves the cutting edges of the teeth clean cut and free from burr. This is true, but saws will certainly cut just as well filed one way as the other.

One point to be observed, however, is that when filing "to the heel" the cutting edges of the saw teeth become more obtuse as the vertical angle between the longitudinal axis of the file and the vertical surface of the saw becomes more acute and vice versa when filing "to the point." It will be observed that the angle referred to is neither the so called "side angle" nor the "pitch angle."

Finally, all saws should be jointed and set whenever these operations are required. Jointing the teeth makes them all even and also creates a bright reflective surface on the points of the teeth. This is important because this reflection of light is one of the chief requirements to guide the workman's eye in proper saw filing.

I claim:

1. In a file holder of the class described, a handle forming member attachable to the outer end of a file preparatory to filing a saw therewith, said member comprising a pair of spaced apart parallel plates, a turnable adjustable cylindrical housing member bridging the space between the midlength portions of said plates, means for securing said paired plates to each other and simultaneously frictionally holding said cylindrical member in its adjusted relation to said plates, said housing member having through its midlength portion a diametrical bore, a sleeve turnably adjustable in said bore, said sleeve having an arcuate circumferentially extending slot, a clamping screw extending axially into the end of said housing member, the inner end portion of said screw being positioned in said slot to limit the range of turnable adjustment of said sleeve, a chuck having an open end for the insertion of an end of a file thereinto, the opposite end of said chuck projecting into said sleeve with a working fit, a pin projecting radially from said chuck in a spaced relation to its end, the aforesaid sleeve being provided with notches in its end portions, the individual notches in one end of said sleeve being diametrically opposite to corresponding individual notches in the opposite end thereof, said pin when seated in a given notch at one side of the aforesaid handle member correctly positioning a file for filing one side of each of a series of saw teeth and when engaging the diametrically opposite notch in the opposite end of the sleeve automatically positioning the file for filing the opposite sides of each of said series of saw teeth.

2. In a file holder of the class described, an elongated handle forming member attachable to the outer end of a file preparatory to filing a saw therewith, a turnably adjustable cylindrical housing member carried by the midlength portion of said handle forming member and frictionally maintained thereby in its adjusted position, said housing member having through its midlength portion a diametrical bore, a sleeve turnably adjustable in said bore, said sleeve having an arcuate circumferentially extending slot, a clamping screw extending axially into the end of said housing member, the inner end of said screw being positioned in said slot to limit the range of adjustment of said sleeve, a chuck having an open end for the insertion of an end of a file thereinto, the opposite end of said chuck projecting into said sleeve with a working fit, a pin projecting radially from said chuck in a spaced relation to its end, the aforesaid sleeve being provided with notches in its end portions, the individual notches in one end of said sleeve being diametrically opposite to corresponding individual notches in the opposite end thereof, said pin when seated in a given notch at one side of the aforesaid handle member, correctly positioning a file for filing one side of each of a series of saw teeth and when engaging the diametrically opposite notch in the opposite end of the sleeve automatically positioning the file for filing the opposite sides of each of said series of saw teeth.

3. In a file holder of the class described, an elongated handle forming member attachable to the outer end of a file preparatory to filing a saw therewith, said handle member including side portions in a parallel spaced apart relation to each other, a turnably adjustable cylindrical housing member carried by and between said side portions of said handle forming member and frictionally maintained by them in its adjusted position, said housing member having through its midlength portion a diametrical bore, a sleeve turnably adjustable in said bore, said sleeve having an arcuate circumferentially extending slot, a clamping screw extending axially into the end of said housing member, the inner end portion of said screw being positioned in said slot to limit the range of turnable adjustment of said sleeve, a chuck having an open end for the insertion of an end of a file thereinto, the opposite end of said chuck projecting into said sleeve with a working fit, a pin projecting radially from said chuck in a spaced relation to its end, the aforesaid sleeve being provided with notches in its end portions, the individual notches in one end of said sleeve being diametrically opposite to corresponding individual notches in the opposite end thereof, said pin when seated in a given notch at one side of the aforesaid handle member correctly positioning a file for filing one side of each of a series of saw teeth and when engaging the diametrically opposite notch in the opposite end of the sleeve automatically positioning the file for filing the opposite sides of each of said series of saw teeth.

FREDERICK C. BROTHERS.